United States Patent [19]
Chang

[11] Patent Number: 6,025,865
[45] Date of Patent: Feb. 15, 2000

[54] VARIABLE COLOR INTENSITY LASER PRINTING

[75] Inventor: Samuel Chang, Arcadia, Calif.

[73] Assignees: Mitsubishi Chemical America, White Plains, N.Y.; Olive Tree Technology, Inc., Arcadia, Calif.

[21] Appl. No.: 08/756,586

[22] Filed: Nov. 27, 1996

Related U.S. Application Data

[60] Provisional application No. 60/025,890, Sep. 10, 1996.

[51] Int. Cl.[7] .................................................. B41J 2/47
[52] U.S. Cl. ............................................................ 347/255
[58] Field of Search .................................. 347/135, 136, 347/175, 176, 239, 240, 251, 252, 255, 213, 256, 131; 358/298

[56] References Cited

U.S. PATENT DOCUMENTS

| | | | |
|---|---|---|---|
| 4,799,069 | 1/1989 | Sasaki et al. ............................ | 347/252 |
| 4,926,248 | 5/1990 | Kobayashi et al. .................... | 358/501 |
| 4,946,233 | 8/1990 | Seto ........................................ | 347/135 |
| 5,260,719 | 11/1993 | Maloney . | |
| 5,309,178 | 5/1994 | Gross . | |
| 5,321,426 | 6/1994 | Baek et al. ............................. | 347/240 |
| 5,386,221 | 1/1995 | Allen et al. . | |
| 5,663,755 | 9/1997 | Wada et al. ............................ | 347/176 |
| 5,742,317 | 4/1998 | Kashihara .............................. | 347/131 |
| 5,751,470 | 5/1998 | Damon .................................. | 358/298 |
| 5,764,268 | 6/1998 | Bills et al. ............................. | 347/213 |

OTHER PUBLICATIONS

John Lekavich, "Basics of acousto–Optic Devices: Acousto–Optic Beam Modulators and Deflectors Control Laserbeams in Many Applications", Lasers & Applications (Apr. 1986), pp. 59–64.

*Primary Examiner*—N. Le
*Assistant Examiner*—L. Anderson
*Attorney, Agent, or Firm*—Oblon, Spivak, McClelland, Maier & Neustadt, P.C.

[57] ABSTRACT

Direct dye thermal transfer printing, sublimation dye printing and thermal wax printing may be effected by impinging the energy modulated zero order beam of a laser print energy source on an image forming substance such as a direct dye thermal transfer printing medium, a sublimation dye printing medium, and a thermal wax printing medium. Printing may also be effected by a method involving providing an original electronic color data set, which contains pixels which contain intensity information in the time domain optionally increasing the optical resolution of the data set, dividing one or more of the pixels in the time domain, to obtain a data set containing one or more time-sliced pixels, and printing the data set containing one or more time-sliced pixels.

27 Claims, 2 Drawing Sheets

VARIABLE COLOR INTENSITY LASER PRINTING

This application claims benefit to copending provisional application Ser. No. 60/025,890 filed Sep. 10, 1996.

FIELD OF THE INVENTION

The present invention relates to methods for variable color intensity laser printing. More particularly, the present invention relates to the use of a modulator to control the intensity level of the zero order beam of a laser and the use of this variable intensity (modulated) zero order beam to effect color recording. In another embodiment, which may be used in combination with the invention modulated zero order beam embodiment, pixels are time sliced at higher resolutions than that ultimately desired and laser power is controlled in an on/off fashion for each given pixel portion. Apparatus which can be used to carry out the invention recording methods is also described herein and makes up a part of the invention.

BACKGROUND OF THE INVENTION

Currently, recording methods are known which use a laser beam as the print energy provider. However, currently available popular recording media are relatively sensitive to laser power and are incapable of absorbing a laser's zero order beam without significant negative consequences. Laser xerographic printers using organic photoconducting drums or ribbons fall into this category. Problems occur even at the relatively low power levels currently in use for laser printers (5 mW-1 W). In order to overcome these drawbacks, the laser beam is broken up (diffracted) into several beams (zero order (original) beam, first order beam, second order beam, etc.), and it is the higher order beams that are used to effect printing (recording) because they can change from zero energy to a positive energy level which is lower than the energy level of the zero order beam. The zero order beam always carries some residual energy (e.g., 15–30%) when higher order beams are present and carries all energy in the absence of higher order beams. See, for example, U.S. Pat. Nos. 5,309,178 and 5,457,567. In the past, such "diffracted" laser printing technology has been used to effect laser xerographic types of printing.

Since laser printing technology which uses higher order beams (i.e., beams other than the zero order beam) of a laser to effect printing necessarily use only a portion of the energy contained within the laser, there is a significant loss in terms of energy efficiency. Moreover, the use of only higher order beams in effecting printing requires, at the minimum, relatively complicated optics capable of precisely controlling the location of the generated higher order beams and further requires a design capable of blocking the remaining zero order beam and the other unused higher order beams since even the remaining zero order beam cannot be allowed to impinge upon such recording media as those described above (e.g., organic photoconducting drum or ribbon) for the same reasons that these recording media cannot be allowed to interact with the undiminished zero order beam (i.e., even the zero order beam which remains upon generation of higher order beams has an energy content which is too high to be effectively handled by print media currently used in laser printing).

The variation of color intensity for laser-induced color printing is currently accomplished by varying the energy level of the first order beam between zero and a pre-set valve either by a single or multi-channel modulator. Currently, it is impossible to continuously vary the color intensity of a single pixel as opposed to two levels (on/off) and thus impossible to provide high resolution, continuous tone printed images.

OBJECTS OF THE INVENTION

It is one object of the invention to provide a method for the formation of a variable continuous tone color recorded image using a laser as print energy source.

It is another object of the present invention to vary the color intensity of individual pixels during recording using the zero order beam of a laser as the print energy source.

It is another object of the present invention to provide varying color intensity recording within individual pixels by dividing the pixels into equal or unequal shares and operating a laser print energy source in an on/off fashion or continuous variable tone fashion for a given individual share within each pixel.

It is another object of the invention to provide a printer apparatus capable of accomplishing one or more of the invention printing methods.

Other objects of the invention will become apparent upon a further understanding of the present invention and by reference to the attached Figures.

DETAILED DESCRIPTION OF THE PREFERRED EMBODIMENTS

Figure 1:
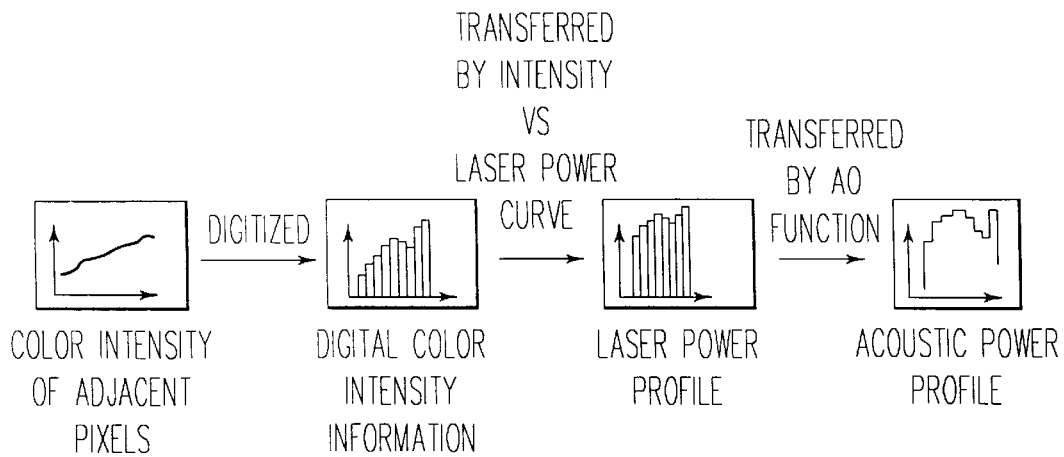
FIG. 1 is a block diagram illustrating one preferred embodiment of the present invention wherein the color intensity of adjacent pixels is digitized, converted into a zero order beam laser powder level via an intensity versus laser power curve and then transferred into a modulator power level by an acousto-optic or electro-optic function to provide a modulator power profile.

The present invention relates to laser recording methods and apparatuses for effecting laser recording. The "recording" accomplished by the invention method and apparatus includes the permanent or transient recording of images, indicia, etc., on any type of substrate, print-receiving media, etc. and it not limited to any particular type of image or to any particular image color. In fact, the present invention relates to all colors including black and provides for continuous tone regardless of color (gray scale included).

As used herein, the term "pixel" means a minimum physical spacial quanta. In the invention, printing (recording) is two dimensional, so each pixel has two dimensions. For example, if printing is effected at 1200 dots per inch, 600 lines per inch, the horizontal dimension of a pixel is $\frac{1}{1200}$ inch and the vertical dimension is $\frac{1}{600}$ inch. In the invention, pixel size is not limited and includes 300–2500 dots per inch printing and 300–2500 lines per inch printing.

The term "zero order beam" refers to the original beam which emanates from a laser source. Higher order beams including first order beams, second order beams, etc., are defined as being derived from the original, zero order beam and emanating from an optical medium which diffracts the zero order beam. Higher order beams typically are generated in pairs and have lower energy than the zero order beam.

In the present invention, the "print energy source" is a laser beam, and more particularly is the zero order beam of the laser. First order, second order and higher order beams are not used in the present invention for effecting image, indicia, etc. recordation.

Lasers useful as a print energy source is herein include the following: laser diodes, Nd: YAG lasers, Nd: YLF lasers, etc. Pulsed and CW lasers are useful. To the extent that pulsed or diode lasers have varying power levels during constant operation, this variation is not included within the meaning of "modulated" herein. Preferable power levels of lasers useful in the present invention are power levels of 1–40 W, more preferably 10–20 W. Although the wavelength of the laser print energy source useful in the present invention is not limited, preferable ranges include 200–10,000 nm, more preferably 700–2,000 nm.

In the present invention, the "image forming substance" is that material which provides a recorded image, indicia, etc. (image) on a substrate by interaction with the zero order laser beam emanating from the laser print energy source. In preferred embodiments the image forming material is arranged on a substrate. Direct dye thermal transfer ribbons, sublimation dyes optionally on carriers and thermal wax image-forming media are highly preferred herein. Transfer printing media described in U.S. Ser. No. 08/686,700 and U.S. Ser. No. 08/523,335 (both incorporated herein by reference) are also useful herein as the image forming substance. In general, however, the image forming material useful herein is any image forming material that can interact with laser print energy to effect recording and withstand impingement of the zero order beam of an invention laser print energy source when significant higher order beams are generated (i.e., a zero order beam diminished in energy) without causing recording.

In a first preferred embodiment of the present invention the color intensity of an entire single pixel may be varied. In general, and in its broadest sense, the first preferred embodiment of the present invention varies the intensity of a laser print source zero order beam with, for example, one or more acousto-optic modulators and/or electro-optic modulators which generate higher order beams and diminishes the energy in the zero order beam, so as to provide a zero order beam of varying intensity which impinges upon the image forming material. This image-forming material is then caused to be transferred pixel by pixel to a receiving substrate in an amount which is proportional to the intensity of the zero order beam. Thus, the first preferred embodiment of the present invention uses a modulated zero order beam to effect continuous variable color tone printing. The zero order beam is not blocked in this first preferred embodiment when printing and can be blocked or significantly diminished in energy (e.g., by one or more cascaded modulators) when not effecting printing. During relatively long periods of non-printing, however, it is convenient to block the zero order beam. In addition, in this first embodiment the higher order beams can be blocked from impinging on the image forming substance by, e.g., a simple shield having an orifice that lets the zero order beam pass. In this first preferred embodiment the zero order beam always is responsible for effecting printing. Since the number, direction, etc. of the generated higher order beams is not important for printing there are fewer design constraints necessary with the invention printer, which reduces manufacturing costs.

According to this first preferred embodiment the zero order beam of a laser print source must be modulated so as to provide variable intensity as a function of time including intensities between full on and full off. Devices capable of providing this variable intensity include acousto-optic modulators and electro-optic modulators which are known in the art. Preferably, the zero order beam is energy modulated in the megahertz and higher range amongst on, off and intermediate power values. In general, acousto-optical (AO) modulators use an acoustic wave to diffract a laser beam passing there-through. The original, zero order beam is partially deflected into higher order beams and the zero order beam is, necessarily, diminished in intensity. Electro-optic (EO) modulators useful herein include total internal reflectance electro-optical modulators capable of diminishing the intensity of the zero order reflected beam with applied electric field. More than one modulator can be used to diminish the zero order beam to any desired degree, particularly to a degree below that which effects printing. In a second embodiment to be described herein (pixel time slicing) AO or EO modulators receive higher multiple clock rate data to switch on (meaning impingement of only the zero order beam) or off (meaning the presence of higher order beams).

In the first preferred embodiment of the invention it is possible to vary the color intensity of each and every individual pixel even for complicated, many-pixel images. One manner of effecting the present invention first preferred embodiment is to measure the color intensity of adjacent pixels of an image to be copied with a color scanner and color image software either together or independently and to transfer this color data information, by the use of a color intensity versus laser power curve (obtained for a given image forming material) into discrete laser powers for each pixel (a laser power profile). This laser power profile reflects the necessary intensity of the zero order beam as a function of position (pixel) on the substrate. This laser power profile can then be used to drive an AO or EO modulator through a laser power-modulator power curve. Alternatively, the discrete power level of each pixel can be integrated (e.g., electronically) with adjacent pixels to form a continuous laser power profile (meaning that within one pixel the power level may not be constant as in the digital method) to drive an AO or EO modulator using a laser power versus modulator power curve. See FIG. 1.

In a highly preferred embodiment of this first preferred embodiment of the invention, the color intensity of adjacent pixels is provided in digital format or, if originally obtained in analog (continuous, non-discreet levels) format, is converted to digital format by any analog/digital convertor known in the art. Whether the color intensity information is analog or digital, it is then transferred into discrete laser powers on a pixel by pixel basis by means of a conversion relation generated by measuring laser intensity versus color intensity for the given recording material being used. This conversion can be done by reference to a standard curve generated by simple experimentation (varying laser intensity and measuring color intensity). The resulting laser power profile must then be generated in the printing apparatus in order to provide the color intensity of adjacent pixels desired in the image to be recorded. This can be accomplished by modulating the intensity of the zero order beam of the laser print energy source to provide the necessary laser power. This power profile is generated by a simple conversion of the laser power profile into a modulator power profile accomplished most efficiently by referring to a standard conversion function generated by simple experimentation (variation of modulator power (acoustic wave, etc.), with concommitment measurement of obtained zero order beam intensity). Of course, the conversion from color data to modulator power profile can be accomplished in one step using combined standard curves for color intensity-laser power and laser power-modulator power in, e.g., one algorithm.

In this way, electrical, acoustical, etc., signals can be sent to the modulator at a time and in a manner so as to deflect, diffract, etc. (reduce) the intensity of the zero order beam. This deflection, diffraction, etc. (intensity reduction), when applied to the zero order beam which impinges on the recording material (for example a direct dye thermal transfer (D2T2) dye ribbon, a thermal wax image recording material, a sublimation dye optionally on a carrier, etc.) provides the right intensity so as to transfer just that amount of color which is desired for a given pixel. In this way, continuously variable color intensity on a per pixel basis is obtained, or, if desired, finer color control can be accomplished through integration. See above.

D2T2 print media are well known in the art and are described in, for example, U.S. Ser. No. 08/523,335. The Panasonic VW-MPS50 postcard printer and Citizen Notebook Printer II use D2T2 print ribbons with thermal pin technology. Thermal wax print media are well known in the art and are currently used in, e.g., the Fargo Primera Pro & Pictura 310 or 310e printers, the QMS ColorScript 210 printer and the Seiko Colorpoint PSX Model 4 printer. Sublimation dye printing is currently used in the Sony UP-D8800, Eastman Kodak 8650, Mitsubishi CP-2000U and 3M Rainbow Color Proofer printers.

Any means capable of varying the intensity of the zero order beam of the invention laser print energy source between at least two print energy levels may be used herein. AO and EO modulators are preferred. More than one modulator may be used.

The invention image forming material is any material capable of forming an image on a surface, substrate, etc. by the action of zero order beam laser energy and preferably is capable of transferring various amounts of material as a function of zero order beam laser power. Most preferably the image forming substance is capable of printing continuous variable tones of a color (including gray scale) as a function of applied zero order beam laser power. D2T2, sublimation dye and thermal wax media are preferred.

The acousto-optic (AO) modulator useful in the present invention is any acousto-optic modulator that uses an acoustic wave to diffract a laser beam passing therethrough. Typical examples are described in *Lasers and Applications.* April 1986, pp 59–64, incorporated herein by reference. Electro-optic (EO) modulators useful herein, are, in particular, total internal reflection electro-optic modulators which are capable of diminishing the zero order reflected beam emanating from a laser print energy source. In all instances, the modulator useful herein should be capable of handling the laser power of the print source selected and preferably be capable of varying the intensity of the zero order beam from a near full-on or full-on energy state to an energy state below that necessary to effect printing, including essentially infinite states therebetween.

In a preferred arrangement, the pixels being printed each are individually addressable and the image forming material is capable of printing various tones of the same color based on the amount of zero order beam laser energy impinging thereon.

Color data information generally exists in bit format. For example, if four colors are to be printed in 32-bit format there are 8 bits per color (32/4) which translates into $2^8=256$ possible discrete levels of color intensity. In the invention neither the bit format is limited (128, 64, 32, 24, etc.) nor are the possible colors, number thereof, or discrete intensity levels. Normal overprinting can be used to mix primary colors, etc.

In a second preferred embodiment of the present invention pixels are individually time sliced. This aspect of the invention can be used alone or in conjunction with the first preferred embodiment described above.

In this second preferred embodiment of the present invention the optical resolution of a pixel (e.g., 600 dots per inch (dpi)) is increased by a multiplying factor which is preferably an integer such as 2, 3, 4, etc. to provide greater resolution and more data to "slice". As an example, using a multiplying factor of 2 makes a 600 dpi optical resolution image into a 1200 dpi optical resolution image.

The original pixel now comprises two finer laser beam's convolution of energy instead of a single coarse energy distribution. In this way, there is more energy at the edges of the pixel, making slicing more meaningful at these edges. For example, where the energy convolution is gaussian the laser energy is high in the center of the pixel and low at the edges. Slicing such a pixel into sections provides edge slices with minimal energy, carrying less relative weight as compared to center slices and weakening the effectiveness of the invention slicing methodology. By increasing resolution edge slices are provided with increased energy, making edge slices relatively more important and easier for mapping. This original optical resolution data also involves conversion of the original lower resolution optical raster output scanner into an upgraded higher resolution scanner. Each pixel of the original optical resolution is then divided into N equal shares where N is preferably an integer such as 2, 3, 4, 5, 6, etc. so as to convert each pixel into, e.g., 8–12 shares (new pixels) using a time slicing factor (N) of 8–12. During the printing of each of these shares (pixels) the laser print energy source can be controlled in an on/off fashion using a modulator power profile (see above). In this way the original 600 dpi pixel will become a high definition sliced pattern of varying color intensity. In fact, there will be $2^8$–$2^{12}$ combinations of different pixel on/off timing arrangements available for each pixel in this example. Another way to think of "time slicing" is that an original, e.g., 8-bit single pixel with color tone information is converted to 8 single bit (on/off) pixels at twice the resolution (where the multiplying factor is 2). All or some pixels of an image may be time sliced.

Figure 2:
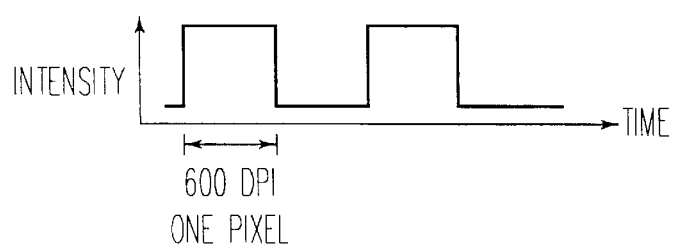
FIG. 2 provides an illustration of the pixel time slicing embodiment described in the present invention.
Figure 2:
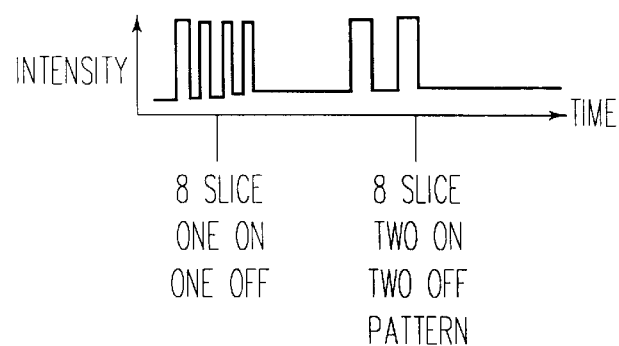
Figure 2:
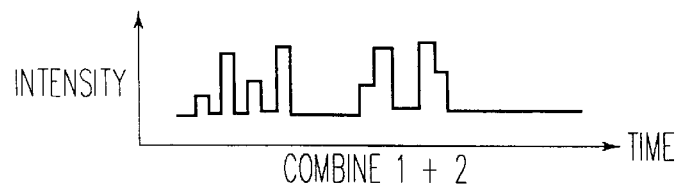

This second preferred aspect of the invention (time slicing) may be combined with the first preferred aspect described above using modulator power control to provide variation of color intensity within each time slice (i.e., each new pixel) instead of providing for simple on/off operation, so as to provide essentially infinite color variation across an original single pixel. When these two techniques are combined the potential variation in color intensity is enormous and may even exceed the image forming material's color tone capability. See FIG. 2, which illustrates this second preferred embodiment of the invention.

EXAMPLES

While the present invention has been described above it is further illustrated below by the use of Examples. The present invention is not limited to these Examples, however.

Example 1

Zero Order Beam Printing

Color data information of a picture, image, etc., is provided in 32, 64, etc., bit format (i.e., the electronic file of a picture, image, etc.). This color data is sent to means for color correction and separation (i.e., software, hardware or a combination of software and hardware, etc.) so as to provide the original picture, image, etc. in separated color data format. In this format, each pixel of each color is present in 8-bit, 16-bit, etc. form in electronic format optionally residing in memory managed by software and/or hardware.

This pixel data is then converted into laser power pixel data according to a color intensity versus laser power curve which is obtained separately in the laboratory and which may be digitized into electronic format. The conversion is a simple mathematical conversion and may be done using an algorithm. The conversion can take place by software, hardware, a combination of software/hardware, by hand, etc. The laser power pixel data obtained is then converted into modulator pixel data according to a separately obtained laser power versus modulator voltage curve which can, optionally, be digitized into electronic format as above. This conversion is also a mathematical calculation which can be accomplished by any means available (software, hardware, a combination thereof, by hand, etc.).

After this conversion process is completed, the modulator pixel data resides in memory according to the position of each color pixel on the picture, image, etc. This modulator data is passed through a D/A (digital-to-analog) process which drives a modulator which modulates the zero order beam of a laser print energy source. The modulator may be any modulator useful in diminishing the zero order beam of the laser print energy source. As described, this printing is digital laser power profile printing.

As mentioned in the body of the invention above, adjacent modulator pixel data can be buffered and integrated through digital signal processing methods and then passed through a D/A process to drive a modulator. This format would provide continuous laser power profile printing.

Example 2

Pixel Time Slicing

Color data information (including intensity, toning, etc.) of a picture, image, etc. is provided in 8, 16, 32, 64, etc., bit format (i.e., the electronic file of a picture, image, etc.) This color data is sent to means for color correction and separation (software, hardware, software and hardware, etc.) to provide separated color data corresponding to the original picture, image, etc. Each pixel of each color is then present as, e.g., 8-bit, 16-bit, etc. data in electronic format (original data bit format divided by number of colors) and optionally resides in memory which may be managed by software and/or hardware.

The color pixel data is mapped into a sliced, or divided, data pattern according to the description provided in the above body of the specification using, e.g., software, hardware, etc. For example, an original single color pixel provided in 8-bit format has an 8-bit color intensity value providing $2^8$ levels. When this pixel is sliced into 8 equal shares electronically 8 1-bit pixels are created (1 bit=on/off or, in this case, total intensity color or no color) to provide, again, $2^8$ color choices. This is so-called 1 to 1 mapping where N=bit format, and can be accomplished by the rule of closest intensity difference between measured sliced pixel pattern color intensity, tone, etc. (color characteristics) and original color characteristics on a per area (pixel) basis. In making a mapping table between the sliced pixel pattern color and original color the sliced pixel patterns are all separately printed in a large enough area to be color measured. In this way a color scale (grey scale) is made and a value assigned to each particular pattern available. These color values are then matched to the original data to effect printing. If the possible number of time slice patterns is less than the pixel color intensity data several original color intensity levels will be consolidated into one time slice pattern. In this way an, e.g., original color pixel, is printed with a time sliced pattern that most closely matches the original color. The mapping need not be 1:1. In addition, time slicing need not be applied to all image pixels, and may be applied selectively within an image if desired typically where more color detail is present.

The sliced color pixel data is then tasked through a laser power conversion and modulator voltage conversion as described in Example 1, and then passed through a D/A converter to drive a modulator at eight times the original clock rate and using an optical raster output scanner which is twice the original resolution.

Example 3

Zero Order Beam Printing Using Time Slicing

This aspect of the present invention combines the printing described in the two Examples described above by logically mixing together the digital laser power profile modulator data and time slicing modulator data using, for example, OR, AND, XOR, etc. means then passing this data through a data convertor to drive a modulator. In an alternate embodiment the time slicing modulator data may be used as a filter to slice the continuous laser power profile modulator wave form and to then drive a modulator.

Example 4

Printing Using Multiple Modulators

Figure 3:
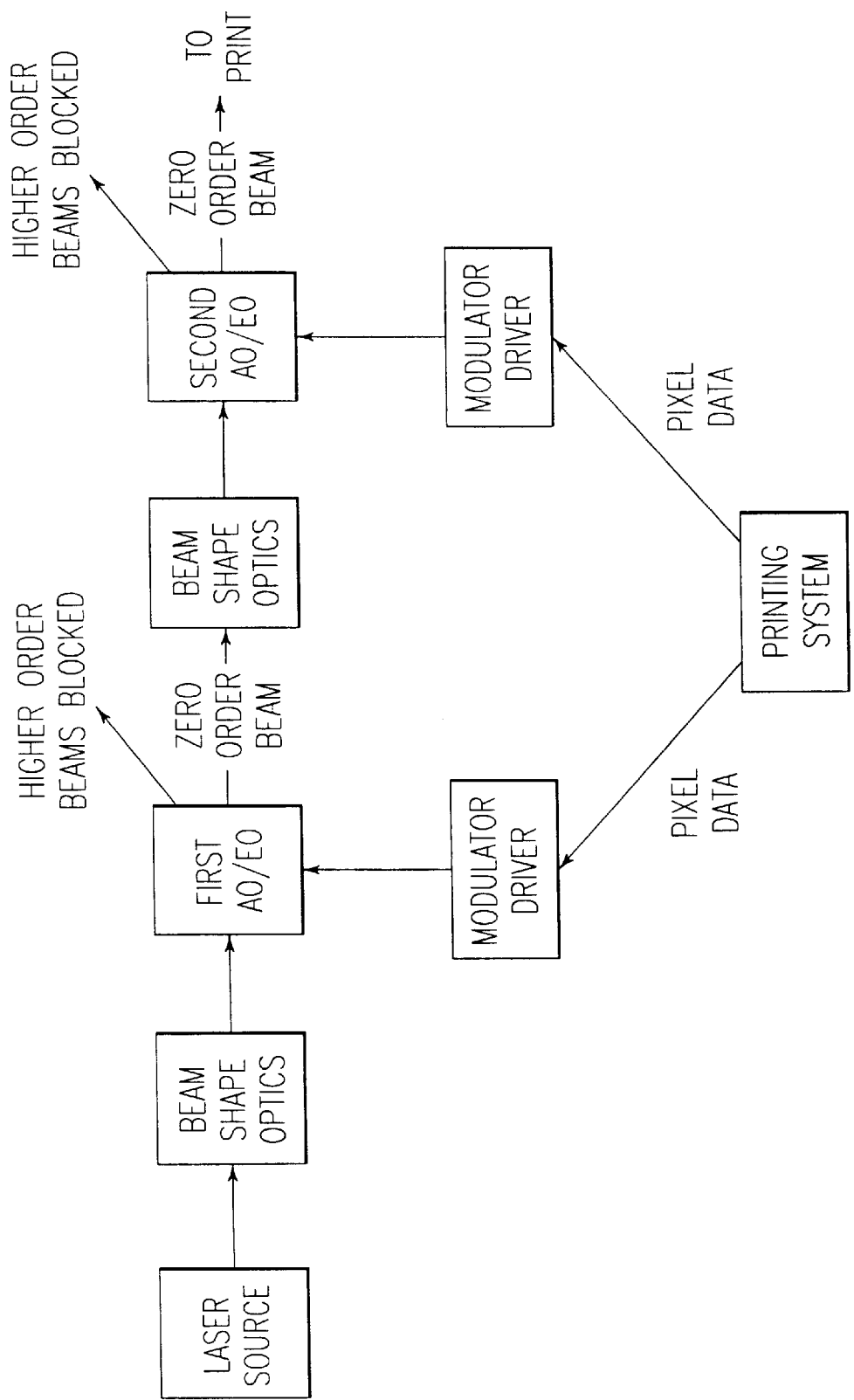
FIG. 3 provides an illustration of the first preferred embodiment of the invention using two modulators.

As described in FIG. 3 multiple modulators can be used in the present invention for printing. In one embodiment the second, "down-beam" modulator may be used simply to blank the zero order beam when a blank pixel is to be "printed". In this way the second modulator is activated to reduce the energy of the zero order beam to below that energy necessary to effect printing. When a non-blank pixel is to be printed, the second modulator is not activated and simply lets the zero order beam pass. In this way the second modulator need only receive blank pixel data from the printing system.

In a second embodiment, a second "down-beam" modulator may be used to assist in effecting printing. In this way, both modulators can receive pixel data and the energy necessary for writing pixels is shared between the two modulators in any fashion desired: evenly, in some proportion, etc. See FIG. 3 for a block diagram of cascaded AO/EO modulators.

The above printing methods can be implemented using a computer (PC, Apple MAC or Power PC, Sun, etc. and may be accomplished in a pure software version with a custom designed plug-in I/O (input/output) control card to drive the modulator. Optionally, an application specific integrated circuit (ASIC) in combination with a DSP processor and/or microprocessor can be used to develop a single board computer which is either stand alone or plugged into a computer to achieve printing at higher speed.

What is claimed is:

1. A printing method comprising:
   (1) providing a laser print energy source;
   (2) providing an image forming substance;
   (3) providing an original electronic color data set, said data set containing pixels and said pixels containing intensity information in a time domain;

(4) optionally increasing an optical resolution of said data set;

(5) dividing one or more of said pixels in a time domain, to obtain a data set containing one or more time-sliced pixels; and (6) printing said data set containing one or more time-sliced pixels by impinging an energy modulated zero order beam of said laser print energy source on said image forming substance, to obtain a printed image.

wherein said energy modulated zero order beam is energy modulated by more than one modulator separate from said laser print energy source and wherein said image forming substance is selected from the group consisting of direct dye thermal transfer, sublimation dye and thermal wax print forming media.

2. The method of claim 1, wherein said zero order beam is energy modulated by at least a first modulator and a second modulator, and said first modulator modulates an amplitude and said second modulator modulates said dividing one or more of said pixels in a time domain.

3. The method of claim 1, wherein said zero order beam has a wavelength of from 200–10,000 nm.

4. The method of claim 1, wherein said laser print energy source has a laser power of 1–40 W.

5. The method of claim 4, wherein said laser power is 10–20 W.

6. The method of claim 1, wherein said image is a 300–2500 dpi image.

7. The method of claim 6, wherein said image is a 300–2500 line per inch image.

8. The method of claim 1, wherein said image is a 300–2500 line per inch image.

9. The method of claim 1, wherein said zero order beam is energy modulated by two modulators.

10. The method of claim 1, further comprising the step of providing color image data with digital color intensity levels to a printer comprising said laser print energy source.

11. The method of claim 1, further comprising providing color image data with continuous color intensity levels to a printer comprising said laser print energy source.

12. The method of claim 1, wherein electronic color data is converted into modulator power and used to drive said modulator to modulate the energy of said zero order beam during image formation.

13. The method of claim 12, wherein said electronic color data is converted into a laser power followed by conversion of the laser power into said modulator power.

14. The method of claim 1, wherein electronic color data is converted into modulator power and tasked to plural modulators cascaded along said zero order beam so as to provide said energy modulated zero order beam.

15. The method of claim 14, wherein said electronic color data is converted into a laser power followed by conversion of the laser power into said modulator power.

16. A printing method comprising:

(1) providing a laser print energy source;

(2) providing an image forming substance;

(3) providing an original electronic color data set, said data set containing pixels and said pixels containing intensity information in a time domain;

(4) optionally increasing an optical resolution of said data set;

(5) dividing one or more of said pixels in a time domain, to obtain a data set containing one or more time-sliced pixels; and (6) printing said data set containing one or more time-sliced pixels by impinging an energy modulated zero order beam of said laser print energy source on said image forming substance, to obtain a printed image, wherein said energy modulated zero order beam is energy modulated by a plurality of modulators separate from said laser print energy source, wherein said image forming substance is selected from the group consisting of direct dye thermal transfer, sublimation dye and thermal wax print forming media, and wherein electronic color data is converted into modulator power and tasked to said plurality of modulators cascaded along said zero order beam so as to provide said energy modulated zero order beam.

17. The method of claim 16, wherein said zero order beam has a wavelength of from 200–10,000 nm.

18. The method of claim 16, wherein said laser print energy source has a laser power of 1–40 W.

19. The method of claim 18, wherein said laser power is 10–20 W.

20. The method of claim 16, wherein said image is a 300–2500 dpi image.

21. The method of claim 20, wherein said image is a 300–2500 line per inch image.

22. The method of claim 16, wherein said image is a 300–2500 line per inch image.

23. The method of claim 16, wherein said electronic color data has digital color intensity levels.

24. The method of claim 16, wherein said electronic color data has continuous color intensity levels.

25. The method of claim 16, wherein said electronic color data is converted into laser power followed by conversion of said laser power into said modulator power.

26. The method of claim 16, wherein said optical resolution of said data is increased.

27. The method of claim 16, wherein said optical resolution of said data is not increased.

* * * * *